United States Patent
Zhang et al.

(10) Patent No.: US 10,520,664 B2
(45) Date of Patent: Dec. 31, 2019

(54) BACKLIGHT MODULE AND DISPLAY DEVICE

(71) Applicants: BOE Technology Group Co., Ltd., Beijing (CN); BEIJING BOE OPTOELECTRONICS TECHNOLOGY CO., LTD., Beijing (CN)

(72) Inventors: Gongtao Zhang, Beijing (CN); Liang Gao, Beijing (CN); Shuanhu Di, Beijing (CN); Lu Yu, Beijing (CN); Junjie Ma, Beijing (CN); Jian Sang, Beijing (CN); Haiwei Sun, Beijing (CN)

(73) Assignees: BOE Technology Group Co., Ltd., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/248,559

(22) Filed: Jan. 15, 2019

(65) Prior Publication Data
US 2019/0146144 A1    May 16, 2019

Related U.S. Application Data

(63) Continuation-in-part of application No. 15/512,852, filed as application No. PCT/CN2016/083451 on May 26, 2016, now Pat. No. 10,234,124.

(30) Foreign Application Priority Data

Mar. 25, 2016    (CN) .......................... 2016 1 0178322

(51) Int. Cl.
*F21V 8/00*    (2006.01)

(52) U.S. Cl.
CPC ......... *G02B 6/0085* (2013.01); *G02B 6/0055* (2013.01); *G02B 6/0088* (2013.01)

(58) Field of Classification Search
CPC ... G02B 6/0085; G02B 6/0055; G02B 6/0088
See application file for complete search history.

(56) References Cited

U.S. PATENT DOCUMENTS

2006/0028154 A1‡  2/2006  Shimokawa ...... G02F 1/133604
                                                                    315/30
2009/0135332 A1‡  5/2009  Hahm ............... G02F 1/133603
                                                                    349/61
(Continued)

FOREIGN PATENT DOCUMENTS

CN        2630890 Y  ‡  8/2004
CN        2630890 Y        8/2004
(Continued)

OTHER PUBLICATIONS

First Office Action for Chinese Application No. 201610178322.4, dated Oct. 9, 2017, 9 Pages.‡

(Continued)

*Primary Examiner* — Donald L Raleigh
(74) *Attorney, Agent, or Firm* — Intellectual Valley Law, P.C.

(57) ABSTRACT

A backlight module and a display device are provided. The backlight module includes: a rubber frame, a reflective film and an optical component. The optical component is arranged at a receiving region formed on the top of the rubber frame, the rubber frame is provided with an adhesive at the bottom, and the reflective film is fixed to the rubber frame through the adhesive to space the reflective film apart from the optical component by a predetermined interval.

14 Claims, 8 Drawing Sheets

(56) References Cited

U.S. PATENT DOCUMENTS

| | | | | |
|---|---|---|---|---|
| 2010/0020263 | A1 | | 1/2010 | Murao et al. |
| 2010/0033954 | A1 | ‡ | 2/2010 | Boonekamp ............... F21S 8/00 362/97 |
| 2014/0036540 | A1 | ‡ | 2/2014 | Kim ...................... G02B 6/0068 362/61 |
| 2014/0160791 | A1 | * | 6/2014 | Guo ..................... G02B 6/0031 362/609 |
| 2016/0187557 | A1 | * | 6/2016 | Zhang .................... G02B 6/009 362/606 |
| 2016/0245976 | A1 | ‡ | 8/2016 | Li ........................ G02B 6/0021 |
| 2016/0356951 | A1 | ‡ | 12/2016 | Gao ..................... G02B 6/0088 |
| 2017/0131454 | A1 | * | 5/2017 | Zhang .................. G02B 6/0021 |

FOREIGN PATENT DOCUMENTS

| | | | | | |
|---|---|---|---|---|---|
| CN | 1727943 | A | ‡ | 2/2006 | ....... G02F 1/133604 |
| CN | 1727943 | A | | 2/2006 | |
| CN | 1837915 | A | | 9/2006 | |
| CN | 101076224 | A | | 11/2007 | |
| CN | 101076224 | A | ‡ | 11/2007 | |
| CN | 101334553 | A | | 12/2008 | |
| CN | 101334553 | A | | 12/2008 | |
| CN | 101517463 | A | | 8/2009 | |
| CN | 101523109 | A | | 9/2009 | |
| CN | 101523109 | A | ‡ | 9/2009 | ............... F21S 8/00 |
| CN | 201571254 | U | | 9/2010 | |
| CN | 201571254 | U | ‡ | 9/2010 | ............... F21S 4/24 |
| CN | 202182365 | U | | 4/2012 | |
| CN | 202182365 | U | ‡ | 4/2012 | |
| CN | 202474027 | U | ‡ | 10/2012 | |
| CN | 202474027 | U | | 10/2012 | |
| CN | 102865472 | A | ‡ | 1/2013 | |
| CN | 102865472 | A | | 1/2013 | |
| CN | 102878493 | A | | 1/2013 | |
| CN | 102878493 | A | ‡ | 1/2013 | ............ G02B 6/0088 |
| CN | 203223817 | U | ‡ | 10/2013 | |
| CN | 203223817 | U | | 10/2013 | |
| CN | 203349029 | U | ‡ | 12/2013 | |
| CN | 203349029 | U | | 12/2013 | |
| CN | 103574400 | A | | 2/2014 | |
| CN | 103574400 | A | ‡ | 2/2014 | ............ G02B 6/0068 |
| CN | 103672724 | A | | 3/2014 | |
| CN | 103672724 | A | ‡ | 3/2014 | |
| CN | 203661401 | U | | 6/2014 | |
| CN | 203661401 | U | ‡ | 6/2014 | |
| CN | 203686726 | U | ‡ | 7/2014 | |
| CN | 203687260 | U | | 7/2014 | |
| CN | 103968300 | A | | 8/2014 | |
| CN | 103968300 | A | ‡ | 8/2014 | |
| CN | 104251423 | A | | 12/2014 | |
| CN | 104251423 | A | ‡ | 12/2014 | ............ G02B 6/0021 |
| CN | 104279465 | A | | 1/2015 | |
| CN | 104279465 | A | ‡ | 1/2015 | |
| CN | 204372713 | U | ‡ | 6/2015 | ............ G02B 6/0055 |
| CN | 204372713 | U | | 6/2015 | |
| JP | 2002189207 | A | | 7/2002 | |
| JP | 2010103308 | A | | 5/2010 | |
| JP | 2010103308 | A | ‡ | 5/2010 | |

OTHER PUBLICATIONS

International Search Report and Written Opinion for Application No. PCT/CN2016/083451, dated Dec. 26, 2016, Pages.‡

International Search Report & Written Opinion dated Dec. 26, 2016 regarding PCT/CN2016/083451.

First Office Action in the Chinese Patent Application No. 201610178322.4, dated Oct. 9, 2017; English translation attached.

Second Office Action in the Chinese Patent Application No. 201610178322.4, dated Jun. 15, 2018; English translation attached.

Notice of Allowance in the U.S. Appl. No. 15/512,852, dated Nov. 21, 2018.

Third Office Action in the Chinese Patent Application No. 201610178322.4, dated Jun. 18, 2019; English translation attached.

\* cited by examiner

‡ imported from a related application

BACKLIGHT MODULE AND DISPLAY DEVICE

CROSS-REFERENCE TO RELATED APPLICATION

This application is a continuation-in-part of U.S. application Ser. No. 15/512,852 filed May 26, 2016, which is a national stage application under 35 U.S.C. § 371 of International Application No. PCT/CN2016/083451 filed May 26, 2016, which claims priority to Chinese Patent Application No. 201610178322.4, filed Mar. 25, 2016. Each of the forgoing applications is herein incorporated by reference in its entirety for all purposes.

TECHNICAL FIELD

The present disclosure relates to the field of display technology, and in particular to a backlight module and a display device.

BACKGROUND

A heat emission of a display device is mainly due to heat generated by integrated circuits (ICs) and light-emitting diode (LEDs) emitting light. Currently, the display device is developed to be ultrathin and have a narrow bezel and a high definition, and thus the LEDs are getting more and more. Meanwhile, according to the requirement of high color gamut, the LEDs may not be made of the conventional silicate or yttrium aluminum garnet (YAG) phosphor powers, but the red and green (RG) phosphor powers with low light conversion efficiency. Therefore, the LEDs are the main heat emission sources of the display device.

In the related art, heat may be superposed at positions where ICs and LEDs of the display device overlap in the vertical direction so that heat is unevenly distributed in the entire space, and then the film layer structure may be deformed and folded as a result. Therefore, at present, there is a need to improve the heat dissipation capability of the module and avoid the unevenly heating at the IC side of the module.

SUMMARY

An object of the present disclosure is to improve the heat dissipation capability of LEDs in the display device so as to avoid the deformation and fold occurring in the layer structure of the display device caused by heat superposition formed between the LEDs and the IC.

To solve the above technical issues, in one aspect, a backlight module is provided in some embodiments of the present disclosure, which includes a rubber frame, a reflective film and an optical component arranged at a receiving region formed on a top of the rubber frame.

The rubber frame is provided with an adhesive at a bottom side, and the reflective film is fixed to the rubber frame through the adhesive, to space the reflective film apart from the optical component by a predetermined interval.

Optionally, the rubber frame comprises a first portion and a second portion, the first portion is arranged between the optical component and the adhesive, and the second portion is perpendicular to the reflective film and extends in a direction from the optical component to the reflective film.

Optionally, the predetermined interval between the optical component and the reflective film is equal to a sum of a thickness of the first portion of the rubber frame in a direction perpendicular to the reflective film and a thickness of the adhesive in the direction perpendicular to the reflective film.

Optionally, the adhesive is discontinuous.

Optionally, the adhesive is a frame structure provided with at least one opening.

Optionally, the backlight module further includes: a blocking wall arranged outside the rubber frame, wherein the blocking wall is protruded towards the bottom side of the rubber frame and provided with an opening.

Optionally, the blocking wall extends from a bottom of the rubber frame to the reflective film.

Optionally, the blocking wall is provided with an opening.

Optionally, the opening of the blocking wall is arranged at a position corresponding to the opening of the adhesive.

Optionally, the opening of the blocking wall is arranged opposite to the opening of the adhesive.

Optionally, the backlight module further includes: a blocking wall arranged outside the rubber frame, wherein the blocking wall is provided with a groove at a side facing the adhesive and the groove penetrates the blocking wall in a direction perpendicular to a bottom of the rubber frame.

Optionally, the blocking wall is provided with a groove at a side facing the adhesive, and the groove penetrates the blocking wall in a direction perpendicular to a bottom of the rubber frame.

Optionally, the groove of the blocking wall is arranged at a position corresponding to the opening of the adhesive.

Optionally, the blocking wall and the rubber frame are integrally formed.

Optionally, the optical component further includes:
a light bar and a heat-conductive film layer arranged at a back side of the light bar.

Optionally, the light bar further includes:
a light-emitting layer, a first insulating layer, a copper foil circuit, a second insulating layer and a covering layer, The covering layer is part of the heat-conductive film layer.

Optionally, the heat-conductive film layer is made of a metallic material.

In another aspect, a display device is further provided in some embodiments of the present disclosure, including the backlight module hereinabove.

The present disclosure has the following beneficial effects:

According to the present disclosure, the reflective film is fixed to the bottom of the rubber frame through the adhesive of a certain thickness, so as to space the reflective film apart from the above optical component by a certain interval, so that the heat generated by the light bar of the optical component is dissipated in the interval, which is conductive to the heat dissipation of the backlight module and reduces heat superposition formed between the IC and the light bar in the display device, thereby effectively avoiding the deformation and fold caused by unevenly heating of the layer structure of the display device.

In another aspect, the present invention provides a backlight module, comprising a rubber frame, a reflective film, a light guide plate, a light bar, and an optical component; wherein the rubber frame is provided with an adhesive at a bottom side, and the reflective film is fixed to the rubber frame through the adhesive; the light guide plate is on the reflective film; the optical component is on a side of the light guide plate away from the reflective film; the light bar is on a first lateral edge of the light guide plate, and is between the first lateral edge of the light guide plate and the rubber frame; and the adhesive is a frame structure provided with at least one opening at a position corresponding to at least a portion of the first lateral edge of the light guide plate adjacent to the light bar.

Optionally, the frame structure are provided with two openings at two positions corresponding to two different portions of the first lateral edge of the light guide plate adjacent to the light bar.

Optionally, the frame structure are further provided with at least one opening at a position corresponding to at least a portion of a second lateral edge different from the first lateral edge.

Optionally, the backlight module further comprises a blocking wall arranged outside the rubber frame, wherein the blocking wall is protruded away from the bottom side of the rubber frame and provided with at least one opening at a position corresponding to the at least one opening of the frame structure.

Optionally, a respective one of the at least one opening of the blocking wall is arranged opposite to a respective one of the at least one opening of the frame structure.

Optionally, the backlight module further comprises a blocking wall arranged outside the rubber frame, wherein the blocking wall is provided with a groove at a side facing the adhesive and the groove penetrates the blocking wall in a direction perpendicular to a bottom of the rubber frame.

Optionally, the groove of the blocking wall is arranged at a position corresponding to the at least one opening of the frame structure.

Optionally, the backlight module further comprises a heat-conductive film layer arranged at a back side of the light bar.

Optionally, the light bar comprises a light-emitting layer, a first insulating layer, a first circuit layer, and a second insulating layer; and the heat-conductive film layer covers at least a portion of the second insulating layer.

Optionally, the heat-conductive film layer is made of a metallic material.

Optionally, the rubber frame comprises a first portion and a second portion, the first portion is on a side of the adhesive away from the reflective film, and the second portion is perpendicular to the reflective film and extends in a direction from the first portion away from the reflective film.

Optionally, the blocking wall and the rubber frame are integrally formed.

In another aspect, the present invention provides a display apparatus comprising the backlight module described herein, a display panel, and one or more integrated circuit connected to the display panel.

In another aspect, the present invention provides a method of fabricating a backlight module, comprising forming a rubber frame, forming a reflective film, forming a light guide plate, forming a light bar, and forming an optical component, forming an adhesive at a bottom side of the rubber frame, and fixing the reflective film to the rubber frame through the adhesive; wherein the light guide plate is formed on the reflective film; the optical component is formed on a side of the light guide plate away from the reflective film; the light bar is formed on a first lateral edge of the light guide plate, and is between the first lateral edge of the light guide plate and the rubber frame; and the adhesive is formed as a frame structure provided with at least one opening at a position corresponding to at least a portion of the first lateral edge of the light guide plate adjacent to the light bar.

DETAILED DESCRIPTION

In order to make the technical issues, technical solutions and advantages of the present disclosure more clear, the present disclosure will be described below in detail in conjunction to the drawings and the embodiments.

The present disclosure provides a solution to solve the deformation of the layer due to unevenly heating of the display device in the related art.

Figure 1:
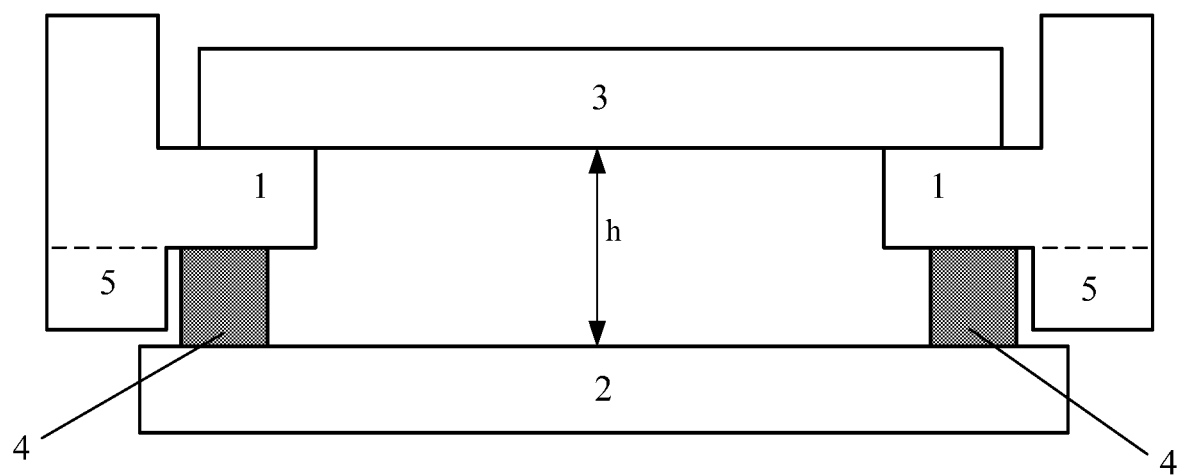
FIG. 1 is a schematic view of a backlight module in the present disclosure.

As shown in FIG. 1, a backlight module is provided in some embodiments of the present disclosure, which includes: a rubber frame 1, a reflective film 2 and an optical component 3 including different functional film layers such as a light bar and circuits.

Specifically, the optical component 3 is arranged at a receiving region formed on the top of the rubber frame 1, an adhesive 4 is arranged at the bottom side of the rubber frame 1, and the reflective film 2 is fixed to the rubber frame 1 through the adhesive 4 so as to space the optical component 3 apart from the reflective film 2 by a predetermined interval h. The predetermined interval h may be adjusted based on actual requirements. Subject to the size requirements of the backlight module, the larger the predetermined interval h is, the larger the interval between the reflective film 2 and the optical member 3 will be, leading to a greater heat dissipation effect.

Figure 10:
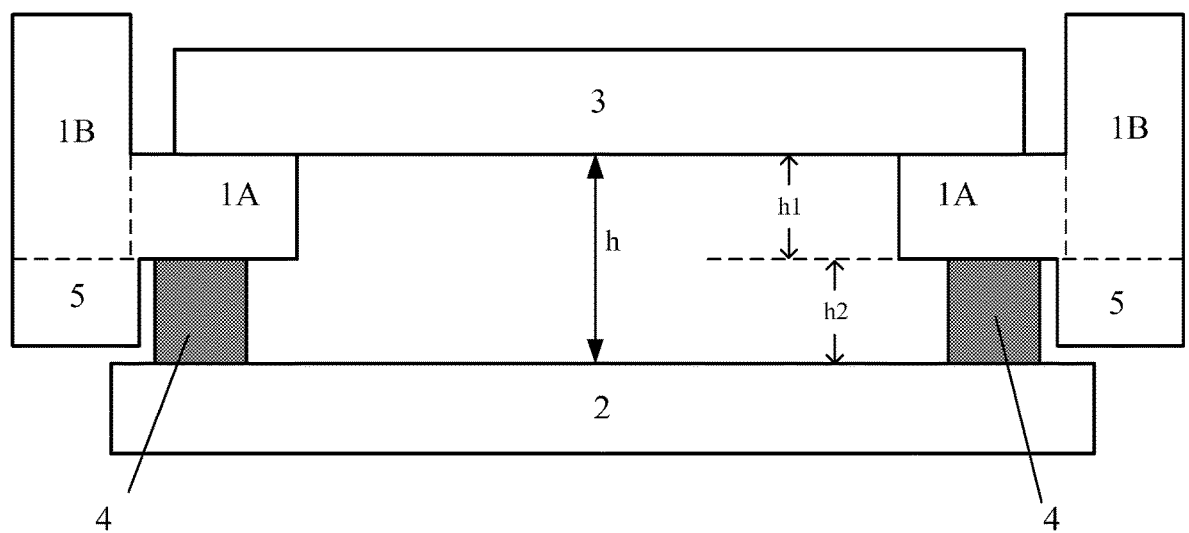
FIG. 10 is a schematic view of a backlight module in the present disclosure.

According to some embodiments of the present disclosure, as shown in FIG. 10, the rubber frame 1 includes a first portion 1A and a second portion 1B. The first portion 1A is positioned between the optical component 3 and the adhesive 4, and the second portion 1B is perpendicular to the reflective film 2 and extends from the reflective film 2 to the optical component 3. The predetermined interval h between the optical component 3 and the reflective film 2 is equal to a sum of the thickness h1 of the first portion 1A of the rubber frame 1 along the direction perpendicular to the reflective film 2 and the thickness h2 of the adhesive 4 along the direction perpendicular to the reflective film 2.

In some embodiments of the present disclosure, the reflective film is fixed to the bottom of the rubber frame through the adhesive of a certain thickness, so as to space the reflective layer apart from the above optical component by a certain interval, so that the heat generated by the optical component may be conducted downwards, which facilitates heat dissipation of the whole backlight module and prevents heat superposition from being formed with the above IC and thus avoids the deformation of the layer structure of the display device caused by unevenly heating thereof.

Figure 2:
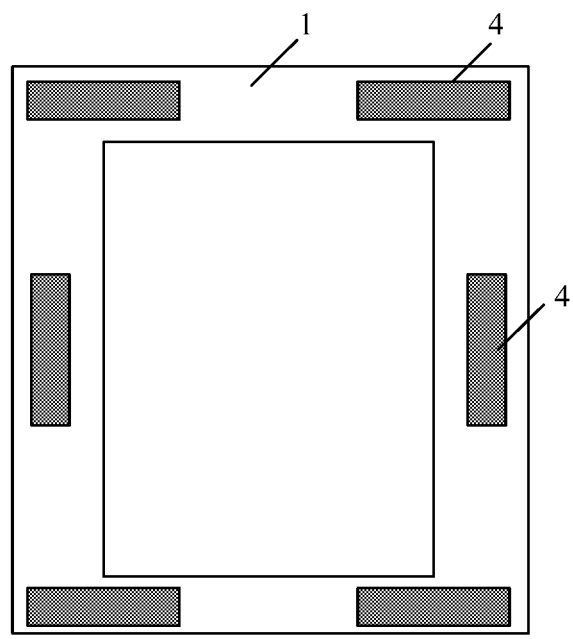
FIGS. 2 and 3 are schematic views showing adhesive arrangements of a backlight module in the present disclosure.

Specifically, in order to further improve the heat dissipation of the optical component, as shown in FIG. 2, the adhesive 4 at the bottom of the rubber frame 1 is discontinuous in some embodiments of the present disclosure so as to form openings at the discontinuities, so that the heat generated by the optical component which is conducted backwards may be dissipated towards the outside of the whole backlight module from the openings of the adhesive 4. As another possible scheme, as shown in the schematic view of the rubber frame of FIG. 3, the adhesive 4 is arranged at the bottom of the rubber frame 1 as a frame structure in some embodiments of the present disclosure. The frame structure has an opening which allows dissipating the heat generated by the optical component towards the outside of the backlight module through the opening of the adhesive 4.

Figure 3:
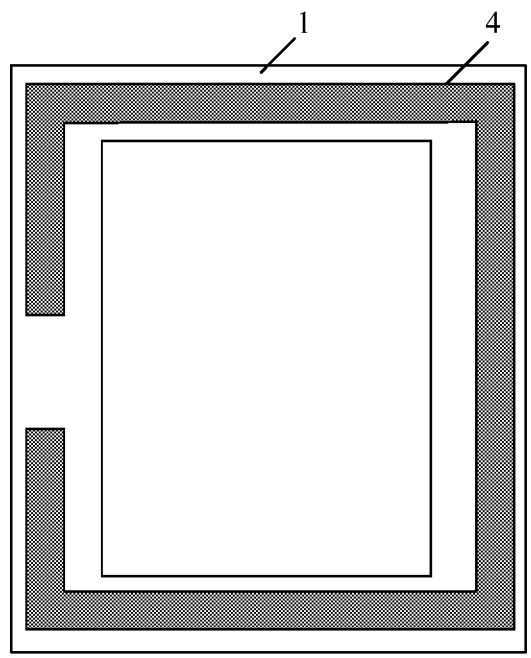

Compared with the embodiment as shown in FIG. 2, the adhesive in the embodiment as shown in FIG. 3 almost conforms to the outline of the rubber frame, and thus the reflective film has a greater fixed area and can be fixed at the bottom of the rubber frame more steadily and reliably. However, it should be noted that the embodiments as shown in FIGS. 2 and 3 are merely illustrative of the adhesive of some embodiments of the present disclosure having an opening structure for heat dissipation, but are not intended to limit the protection scope of the present disclosure. Those skilled in the art may flexibly arrange the adhesive based on the rubber frame structure in the actual backlight module. For example, the adhesive in some embodiments of the present disclosure may be a continuous frame structure and the openings are only arranged at certain regions on the frame structure.

Figure 4:
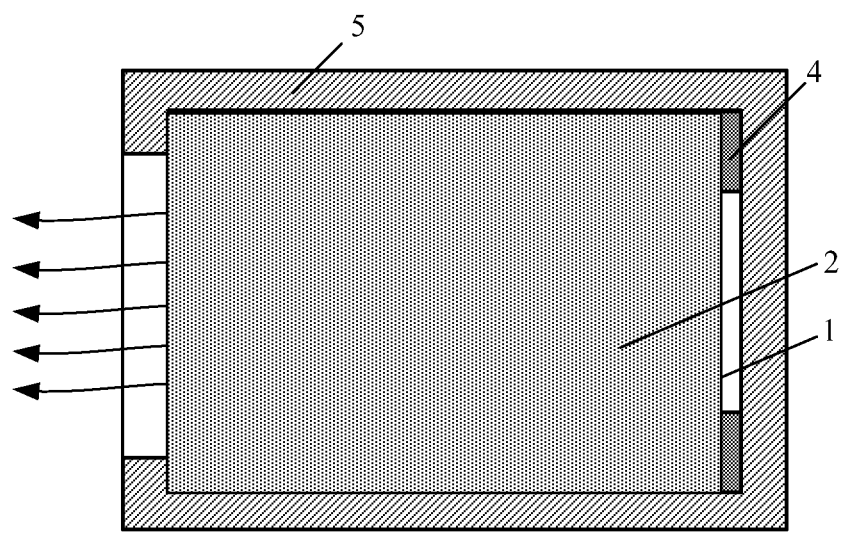
FIGS. 4-7 are schematic views illustrating an optical component of a backlight module in the present disclosure dissipating heat from an opening of a blocking wall.

Furthermore, as shown in FIGS. 1 and 4, the backlight module in some embodiments of the present disclosure further includes a blocking wall 5 arranged outside the rubber frame 1. The retaining wall 5 is protruded at least towards the bottom side of the rubber frame 1 to limit the adhesive 4 and prevent the adhesive 4 from moving. In the present embodiment, in order to prevent the blocking wall 5 from blocking the heat dissipation of the adhesive 4, an opening may be provided in the blocking wall 5, so that some of the heat generated by the optical component is conducted to the sides of the whole backlight module from the openings of the adhesive 4 and blocking wall 5 in the arrow directions in FIG. 4.

Figure 5:
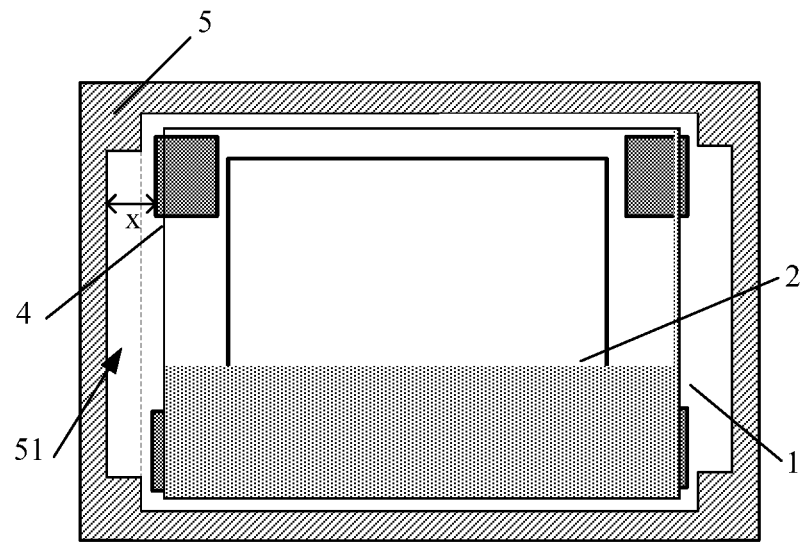
Figure 6:
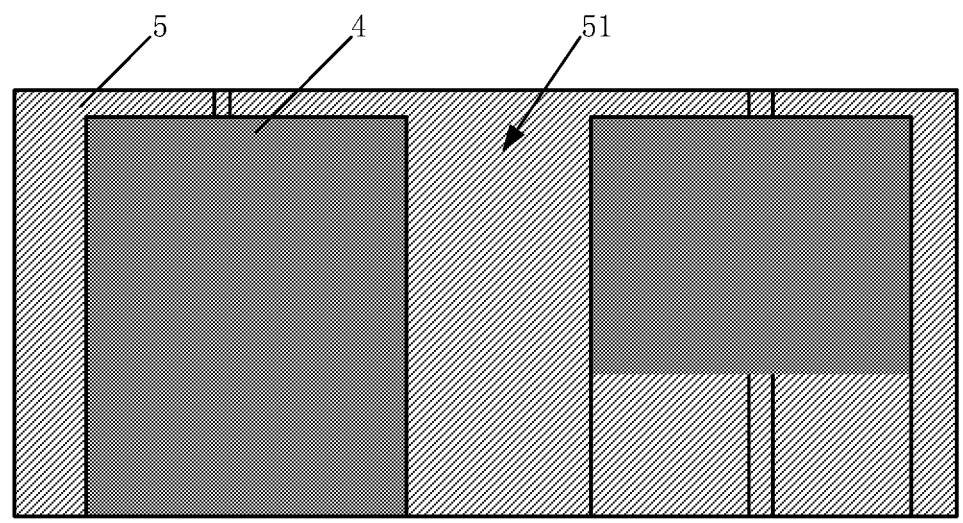

As another possible scheme, as shown in FIGS. 5 and 6, the blocking wall 5 is provided with a groove 51 at a side facing the adhesive 4 and the groove 51 penetrates the blocking wall 5 in a direction perpendicular to a bottom of the rubber frame 1, so that the adhesive 4 is spaced apart from the inner surface of the groove 51 by an interval x, and then the heat dissipated from the opening of the adhesive 4 may be conducted to the lower side of the backlight module along the groove 51. Compared with FIG. 4, since the blocking wall structure as shown in FIGS. 5 and 6 is not provided with openings, it is possible to prevent the outside air condensed into liquid from flowing into the backlight module to a certain extent.

Figure 7:
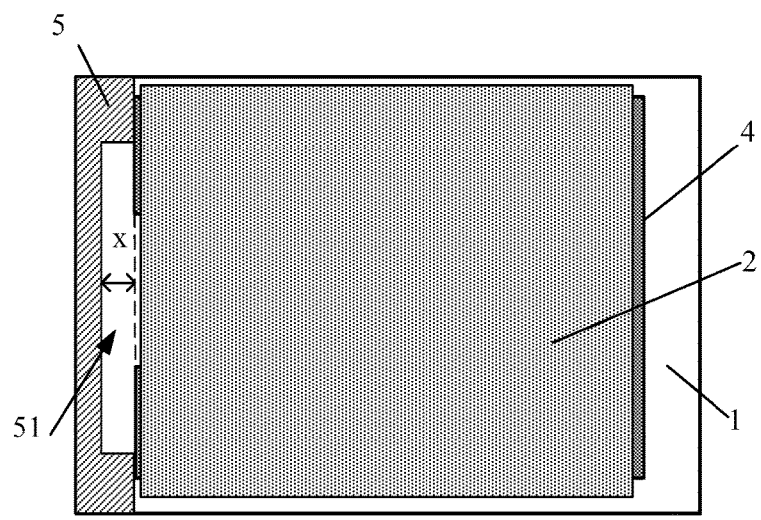

It should be noted in practice, in some embodiments of the present disclosure, the blocking wall may be integrally formed with the rubber frame, i.e., the blocking wall is formed by extending the edges of the rubber frame, or the blocking wall is additionally arranged after the rubber frame is formed. In addition, the blocking wall may be a frame structure arranged in a circle as shown in FIG. 5, or may be arranged merely at one side of the bottom of the frame 1 as shown in FIG. 7. Optionally, when the adhesive 4 is the frame structure having openings as shown in FIG. 7, the openings or grooves in the blocking wall 5 are arranged opposite to the openings of the adhesive 4.

Furthermore, in practice, the heat of the optical component is mainly generated from the light bar. In order to further improve the heat dissipation capability of the light bar, in some embodiments of the present disclosure, the optical component further includes: a heat-conductive film layer arranged at the back side of the light bar and configured to conduct the heat generated by the light bar.

Figure 8:
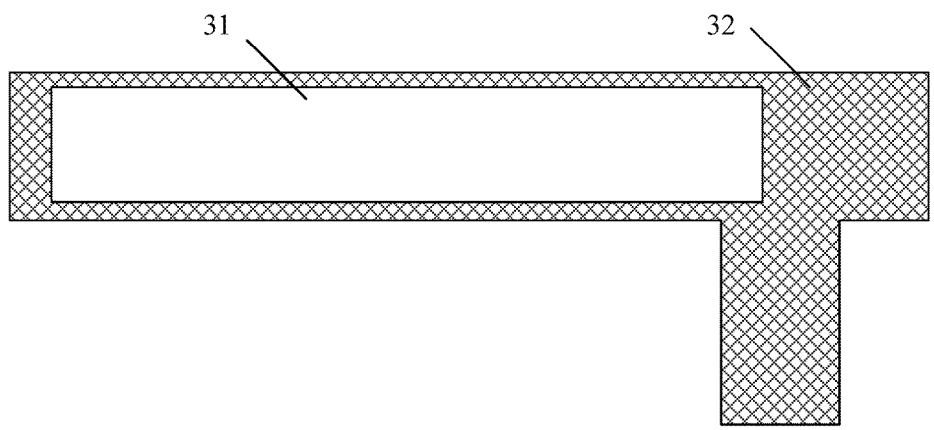
FIG. 8 is a schematic view of an arrangement of a light bar and a heat-conductive film layer in a backlight module in the present disclosure.

In practice, as shown in FIG. 8, a heat-conductive film layer 32 may extend around at the back side of the light bar 31 so as to conduct the heat of the light bar 31 to the surroundings, thereby avoiding the concentration of the heat and helping to improve the heating uniformity.

A light bar is further provided in some embodiments of the present disclosure, which may further improve the heat dissipation capability. The light bar in the present disclosure will be described in detail in conjunction with an embodiment.

Figure 9:
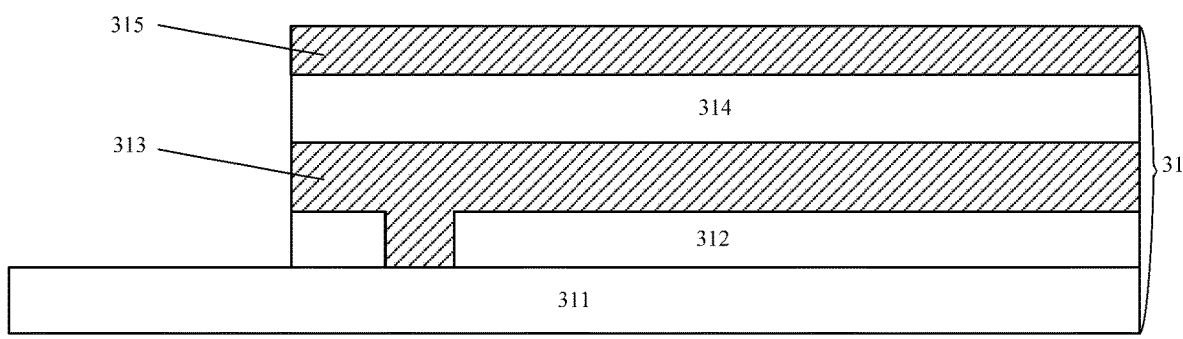
FIG. 9 is a schematic view of a light bar in the present disclosure.

As shown in FIG. 9, the light bar 31 of the backlight module in some embodiments of the present disclosure includes: a light-emitting layer 311, a first insulating layer 312, a copper foil circuit 313, a second insulating layer 314 and a covering film 315.

The copper foil circuit 313 is connected to a power supply at a side to supply a working current to the light-emitting layer 311. It should be noted that the covering film 315 is a structure in the related art for protecting the copper foil circuit 313. In the related art, the covering film 315 is made of a PI material having a poor thermal conductivity. However, in some embodiments of the present disclosure, the covering film 315 is made of a heat-conductive material, so that the covering film 315 may have heat conductivity.

In some embodiments of the present disclosure, the above-mentioned covering film 315 may be made of metallic materials having high thermal conductivity, such as one or more of silver, aluminum, copper. The heat of the light-emitting layer 311 may be conducted through the covering film 315 to the surroundings, thereby ensuring a uniform heating of the layer.

It should be noted that some embodiments of the present disclosure reuse the covering film of the backlight module in related art as the heat-conductive film layer. Unlike the related art, the covering film is made of metallic materials so that the heat dissipation capability of the light bar is improved. No new pattern is added, and thus the manufacturing costs of the backlight module will not be increased.

In summary, compared with the related art, the backlight module in the present disclosure may conduct the heat of the light bar outwards through the opening of the blocking wall and the opening of the adhesive and thus has a good heat dissipation capability, thereby preventing heat superposition from being formed by the backlight module and the IC and effectively eliminating the deformation and fold phenomenon caused by unevenly heating of the layer structure of the display device.

A display device including the above-mentioned backlight module is further provided in some embodiments of the present disclosure. Since the backlight module in the present disclosure has a good heat dissipation capability, it is able to reduce the heat at the positions where the IC and the LED light bar overlap and in turn the heat of the whole layer structure maintains uniform and thereby avoiding the phenomena of deformation and fold, so that the high definition display device provided with numerous LED light bars may be further developed to be more ultrathin and thus has a high practical value.

Figure 11:
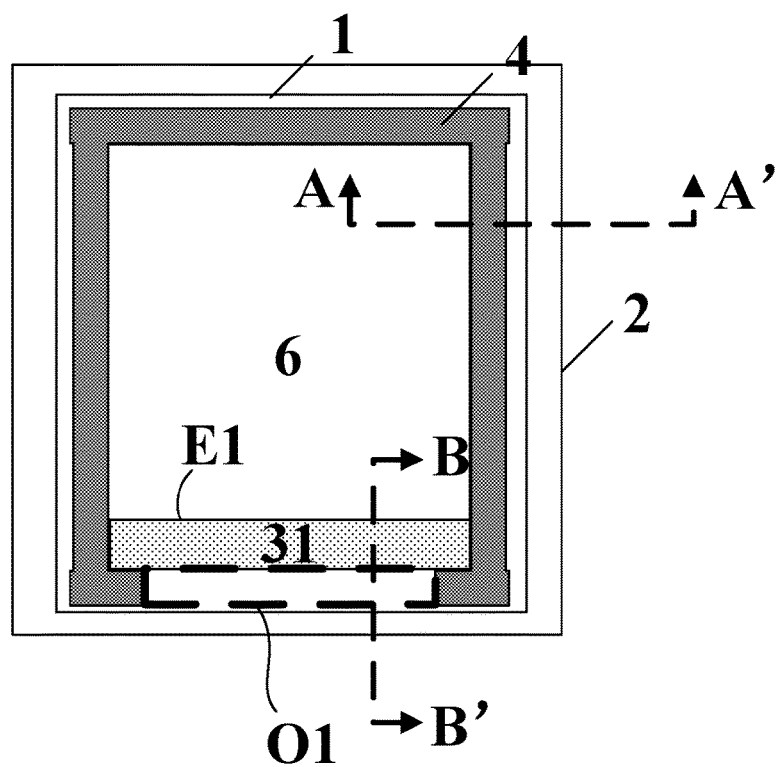
FIG. 11 is a plan view of a backlight module according to some embodiments of the present disclosure.
Figure 12:
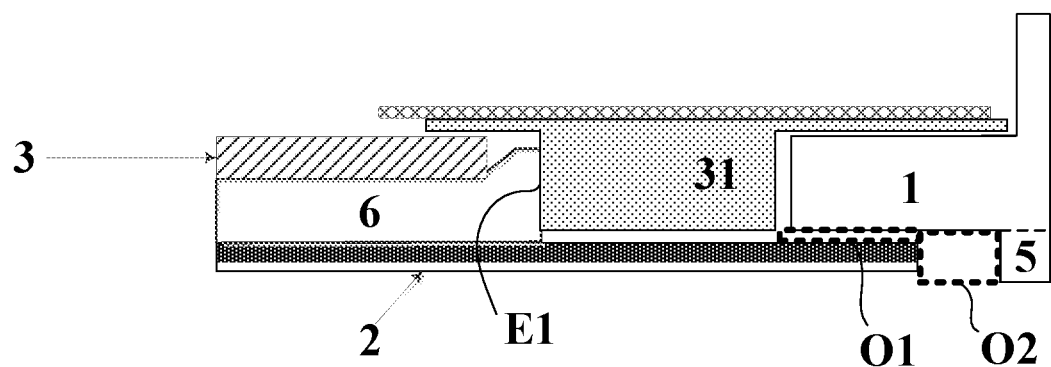
FIG. 12 is a cross-sectional view of a backlight module along an A-A' line of FIG. 11.
Figure 13:
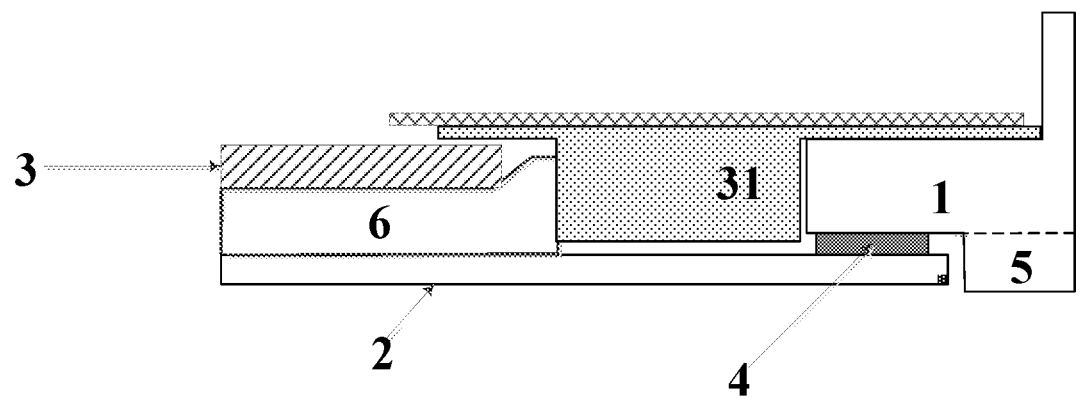
FIG. 13 is a cross-sectional view of a backlight module along a B-B' line of FIG. 11.

FIG. 11 is a plan view of a backlight module according to some embodiments of the present disclosure. FIG. 12 is a cross-sectional view of a backlight module along an A-A' line of FIG. 11. FIG. 13 is a cross-sectional view of a backlight module along a B-B' line of FIG. 11. Referring to FIGS. 11 to 13, the backlight module in some embodiments includes a rubber frame 1, a reflective film 2, a light guide plate 6, a light bar 31, and an optical component 3. The rubber frame 1 is provided with an adhesive 4 at a bottom side, and the reflective film 2 is fixed to the rubber frame 1 through the adhesive 4. Optionally, the light guide plate 6 is on the reflective film 2; the optical component 3 is on a side of the light guide plate 6 away from the reflective film 2; the light bar 31 is on a first lateral edge E1 of the light guide plate 6, and is between the first lateral edge E1 of the light guide plate 6 and the rubber frame 1; and the adhesive 4 is a frame structure provided with at least one opening O1 at a position corresponding to at least a portion of the first lateral edge E1 of the light guide plate 6 adjacent to the light bar 31. For example, the at least one opening O1 is at a position corresponding to at least a portion of the light bar 31. In FIG. 11, the at least one opening O1 includes a single opening.

Figure 14:
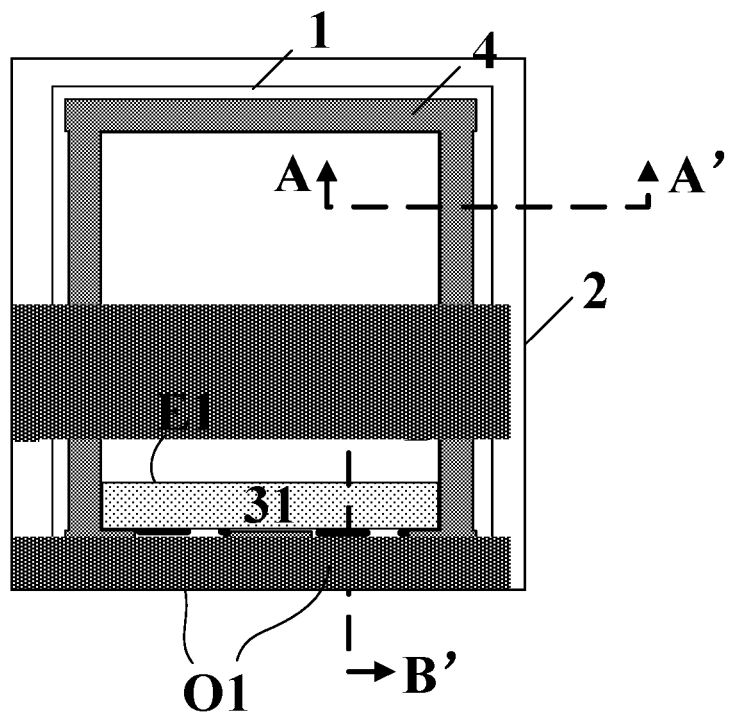
FIG. 14 is a plan view of a backlight module according to some embodiments of the present disclosure.

FIG. 14 is a plan view of a backlight module according to some embodiments of the present disclosure. Referring to FIG. 14, the frame structure of the adhesive 4 in some embodiments is provided with a plurality of opening O1 (e.g., two openings spaced apart by a portion of the adhesive 4) respectively at two positions corresponding to two different portions of the first lateral edge E1 of the light guide plate 6 adjacent to the light bar 31. For example, the plurality of opening O1 are at positions respectively corresponding to a plurality of portions of the light bar 31.

Figure 15:
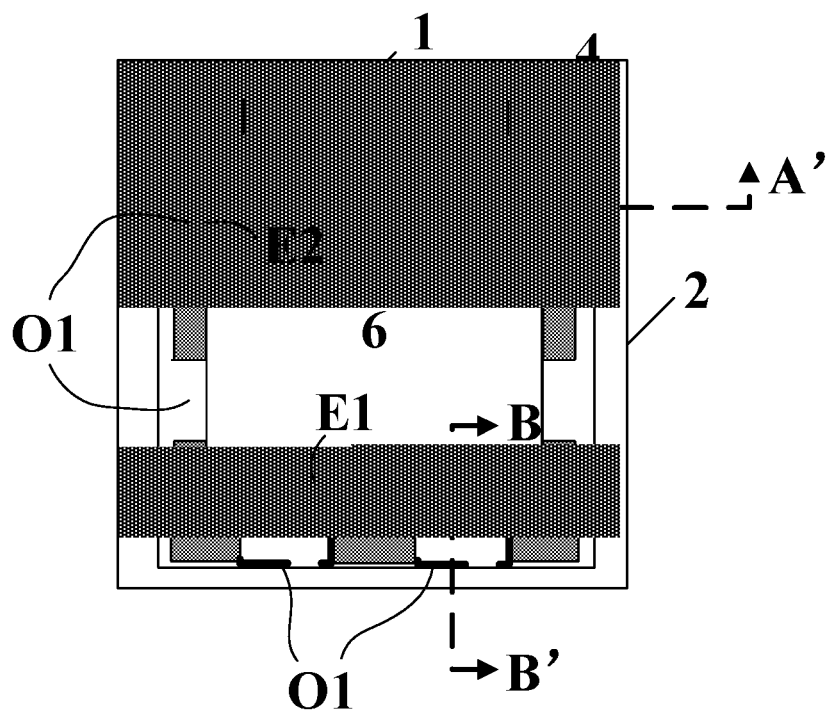
FIG. 15 is a plan view of a backlight module according to some embodiments of the present disclosure.

FIG. 15 is a plan view of a backlight module according to some embodiments of the present disclosure. Referring to FIG. 15, the frame structure of the adhesive 4 in some embodiments is further provided with at least one opening P1 at a position corresponding to at least a portion of a second lateral edge E2 different from the first lateral edge E1.

Referring to FIG. 12 and FIG. 13, in some embodiments, the backlight module further includes a blocking wall 5 arranged outside the rubber frame 1, the blocking wall 5 is protruded away from the bottom side of the rubber frame 1. Referring to FIG. 12, in some embodiments, the blocking wall 5 is provided with at least one opening O2 at a position corresponding to the at least one opening O1 of the frame structure of the adhesive 4. Optionally, a respective one of the at least one opening O2 of the blocking wall 5 is arranged opposite to a respective one of the at least one opening O1 of the frame structure of the adhesive 4.

In some embodiments, the blocking wall 5 is arranged outside the rubber frame 1. Referring to FIGS. 5 and 6, in some embodiments, the blocking wall 5 is provided with a groove 51 at a side facing the adhesive 4 and the groove 51 penetrates the blocking wall 5 in a direction perpendicular to a bottom of the rubber frame 1, so that the adhesive 4 is spaced apart from the inner surface of the groove 51 by an interval x, and then the heat dissipated from the opening of the adhesive 4 may be conducted to the lower side of the backlight module along the groove 51. Optionally, the groove 51 of the blocking wall 5 is arranged at a position corresponding to the at least one opening O1 of the frame structure of the adhesive 4.

In some embodiments, the backlight module further includes a heat-conductive film layer arranged at a back side of the light bar 31.

Figure 16:
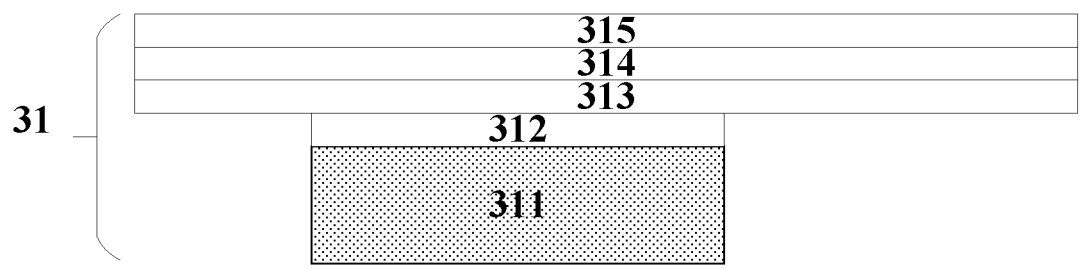
FIG. 16 is a schematic view of a light bar in the present disclosure.

FIG. 16 is a schematic view of a light bar in the present disclosure. Referring to FIG. 16, the light bar 31 in some embodiments includes a light-emitting layer 311, a first insulating layer 312, a first circuit layer 313, and a second insulating layer 314. Optionally, the heat-conductive film layer 315 is on a side of the second insulating layer 314 away from the first circuit layer 313. The heat-conductive film layer 315 is optionally in direct contact with the second insulating layer 314, and covers at least a portion of the second insulating layer 314. In FIG. 16, the heat-conductive film layer 315 covers an entire surface of the second insulating layer 314.

Figure 17:
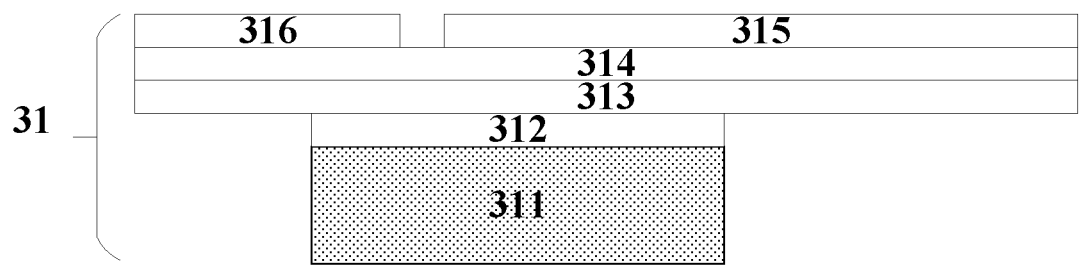
FIG. 17 is a schematic view of a light bar in the present disclosure.

FIG. 17 is a schematic view of a light bar in the present disclosure. Referring to FIG. 17, the heat-conductive film layer 315 covers a portion of the second insulating layer 314. The light bar 31 in some embodiments further includes a second circuit layer 316 on a side of the second insulating layer 314 away from the first circuit layer 313. Optionally, the second circuit layer 316 is in direct contact with the second insulating layer 314, and covers a portion of the second insulating layer 314. Optionally, the second circuit layer 316 and the heat-conductive film layer 315 are in a same layer, made of a same material, and formed using a single mask plate.

Optionally, the heat-conductive film layer 315 is made of a metallic material such as copper.

Figure 18:
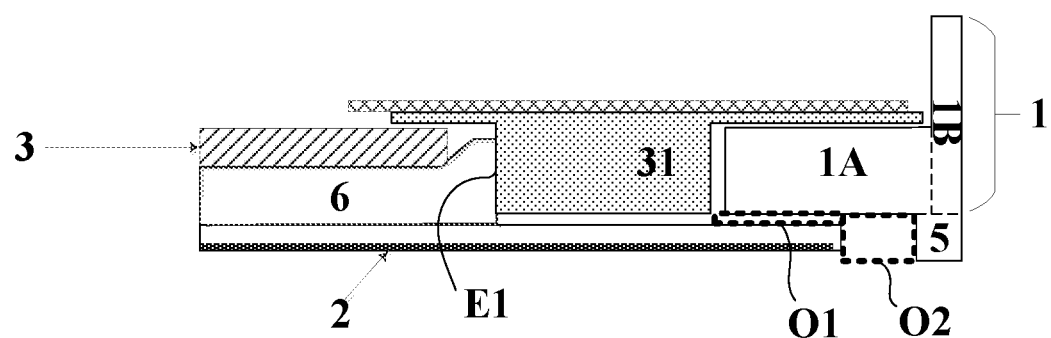
FIG. 18 is a cross-sectional view of a backlight module according to some embodiments of the present disclosure.

FIG. 18 is a cross-sectional view of a backlight module according to some embodiments of the present disclosure. Referring to FIG. 18, the rubber frame 1 in some embodiments includes a first portion 1A and a second portion 1B, the first portion 1A is on a side of the adhesive 4 away from the reflective film 2, and the second portion 1B is perpendicular to the reflective film 2 and extends in a direction from the first portion 1A away from the reflective film 2.

Optionally, the blocking wall 5 and the rubber frame 1 are integrally formed.

In another aspect, the present disclosure provides a display apparatus. In some embodiments, the display apparatus includes the backlight module described herein, a display panel, and one or more integrated circuit connected to the display panel.

In another aspect, the present disclosure provides a method of fabricating a backlight module. In some embodiments, the method includes forming a rubber frame, forming a reflective film, forming a light guide plate, forming a light bar, and forming an optical component, forming an adhesive at a bottom side of the rubber frame, and fixing the reflective film to the rubber frame through the adhesive. Optionally, the light guide plate is formed on the reflective film; the optical component is formed on a side of the light guide plate away from the reflective film; the light bar is formed on a first lateral edge of the light guide plate, and is between the first lateral edge of the light guide plate and the rubber frame; and the adhesive is formed as a frame structure provided with at least one opening at a position corresponding to at least a portion of the first lateral edge of the light guide plate adjacent to the light bar.

The above-mentioned embodiments are merely optional embodiments of the present disclosure. It should be noted that, improvements and modifications may be made by those skilled in the art without departing from the technical principles of the present disclosure. These improvements and modifications should also fall within the scope of the present disclosure.

What is claimed is:

1. A backlight module, comprising a rubber frame, a reflective film, a light guide plate, a light bar, and an optical component;
    wherein the rubber frame is provided with an adhesive at a bottom side, and the reflective film is fixed to the rubber frame through the adhesive;
    the light guide plate is on the reflective film;
    the optical component is on a side of the light guide plate away from the reflective film;
    the light bar is on a first lateral edge of the light guide plate, and is between the first lateral edge of the light guide plate and the rubber frame; and
    the adhesive is a frame structure provided with at least one opening at a position corresponding to at least a portion of the first lateral edge of the light guide plate adjacent to the light bar.

2. The backlight module according to claim 1, wherein the frame structure is provided with two openings respectively at two positions corresponding to two different portions of the first lateral edge of the light guide plate adjacent to the light bar.

3. The backlight module according to claim 1, wherein the frame structure are further provided with at least one opening at a position corresponding to at least a portion of a second lateral edge different from the first lateral edge.

4. The backlight module according to claim 1, further comprising:
    a blocking wall arranged outside the rubber frame, wherein the blocking wall is protruded away from the bottom side of the rubber frame and provided with at least one opening at a position corresponding to the at least one opening of the frame structure.

5. The backlight module according to claim 4, wherein a respective one of the at least one opening of the blocking wall is arranged opposite to a respective one of the at least one opening of the frame structure.

6. The backlight module according to claim 1, further comprising:
    a blocking wall arranged outside the rubber frame, wherein the blocking wall is provided with a groove at a side facing the adhesive and the groove penetrates the blocking wall in a direction perpendicular to a bottom of the rubber frame.

7. The backlight module according to claim 6, wherein the groove of the blocking wall is arranged at a position corresponding to the at least one opening of the frame structure.

8. The backlight module according to claim 1, further comprising a heat-conductive film layer arranged at a back side of the light bar.

9. The backlight module according to claim 8, wherein
    the light bar comprises a light-emitting layer, a first insulating layer, a first circuit layer, and a second insulating layer; and
    the heat-conductive film layer covers at least a portion of the second insulating layer.

10. The backlight module according to claim 8, wherein the heat-conductive film layer is made of a metallic material.

11. The backlight module according to claim 1, wherein the rubber frame comprises a first portion and a second portion, the first portion is on a side of the adhesive away from the reflective film, and the second portion is perpendicular to the reflective film and extends in a direction from the first portion away from the reflective film.

12. The backlight module according to claim 4, wherein the blocking wall and the rubber frame are integrally formed.

13. A display apparatus, comprising the backlight module according to claim 1, a display panel, and one or more integrated circuit connected to the display panel.

14. A method of fabricating a backlight module, comprising forming a rubber frame, forming a reflective film, forming a light guide plate, forming a light bar, and forming an optical component, forming an adhesive at a bottom side of the rubber frame, and fixing the reflective film to the rubber frame through the adhesive;
    wherein the light guide plate is formed on the reflective film;
    the optical component is formed on a side of the light guide plate away from the reflective film;
    the light bar is formed on a first lateral edge of the light guide plate, and is between the first lateral edge of the light guide plate and the rubber frame; and
    the adhesive is formed as a frame structure provided with at least one opening at a position corresponding to at least a portion of the first lateral edge of the light guide plate adjacent to the light bar.

* * * * *